United States Patent
Hicks et al.

(10) Patent No.: US 11,455,154 B2
(45) Date of Patent: Sep. 27, 2022

(54) VECTOR-BASED IDENTIFICATION OF SOFTWARE DEPENDENCY RELATIONSHIPS

(71) Applicant: International Business Machines Corporation, Armonk, NY (US)

(72) Inventors: Andrew C. M. Hicks, Highland, NY (US); Michael E. Gildein, Wappingers Falls, NY (US); Daniel John FitzGerald, Danbury, CT (US); Christopher G. Brooker, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/117,650

(22) Filed: Dec. 10, 2020

(65) Prior Publication Data

US 2022/0188083 A1    Jun. 16, 2022

(51) Int. Cl.
*G06F 8/65* (2018.01)
*G06F 8/41* (2018.01)
*G06F 17/16* (2006.01)

(52) U.S. Cl.
CPC ............ *G06F 8/433* (2013.01); *G06F 8/65* (2013.01); *G06F 17/16* (2013.01)

(58) Field of Classification Search
CPC ..... G06F 8/36; G06F 8/65; G06F 8/71; G06F 11/36; G06F 11/3616
See application file for complete search history.

(56) References Cited

U.S. PATENT DOCUMENTS

| | | | |
|---|---|---|---|
| 6,859,765 B2 | 2/2005 | Gotkis | |
| 8,275,563 B2 | 9/2012 | Marvasti | |
| 9,690,553 B1* | 6/2017 | Brodie | ...................... G06F 8/71 |
| 2008/0155508 A1* | 6/2008 | Sarkar | ................. G06F 11/3616 717/126 |
| 2020/0034135 A1* | 1/2020 | Shi | ........................ G06N 20/00 |

(Continued)

OTHER PUBLICATIONS

Authors et al. Disclosed Anonymously, "Using multiple predictions and standard statistical measures to reduce false positives during real-time, time series analysis of metrics which measure operating system behavior", An IP.com Prior Art Database Technical Disclosure, IP.com No. IPCOM000195181D, Apr. 22, 2010, 3 Pages.

(Continued)

*Primary Examiner* — Duy Khuong T Nguyen
(74) *Attorney, Agent, or Firm* — Cantor Colburn LLP; Teddi Maranzano (57) ABSTRACT

Techniques for vector-based identification of software dependency relationships are described herein. An aspect includes determining a first dependency relationship value between a first code segment and a second code segment. Another aspect includes calculating a magnitude vector based on the first dependency relationship value and a second dependency relationship value corresponding to the first code segment and the second code segment. Another aspect includes determining a relationship score for the first code segment and the second code segment based on the magnitude vector and the first dependency relationship value.

14 Claims, 6 Drawing Sheets

(56) References Cited

U.S. PATENT DOCUMENTS

2020/0057622 A1\* 2/2020 Shtein .................. G06F 8/43
2020/0125996 A1\* 4/2020 Paparaju ............. G06N 3/0472

OTHER PUBLICATIONS

Dam et al., "A deep tree-based model for software defect prediction", arXiv:1802.00921v1 [cs.SE], Feb. 3, 2018, 10 Pages.
Ghanathey et al., "Predicting Software Fault Proneness Using Machine Learning", Western University, Electronic Thesis and Dissertation Repository, 5936, Dec. 19, 2018, 106 Pages.
Mignet et al., "System and Method for Database System Historical Resource Utilization Modeling and Prediction (DBSHRUMP) Based on Workload Characterization and Runtime Monitoring Information.", An IP.com Prior Art Database Technical Disclosure, IP.com No. IPCOM000185470D, Jul. 27, 2009, 5 Pages.
Tantihamthavorn et al., "The Impact of Class Rebalancing Techniques on the Performance and Interpretation of Defect Prediction Models", arXiv:1801.10269v1 [cs.SE], Jan. 31, 2018, 20 Pages.

\* cited by examiner

VECTOR-BASED IDENTIFICATION OF SOFTWARE DEPENDENCY RELATIONSHIPS

BACKGROUND

The present invention generally relates to computer software, and more specifically, to vector-based identification of software dependency relationships.

Understanding complex software is a non-trivial task. Previously, static analysis has been applied to identify various relationships among source code elements, such as define-use relationships. However, traditional static analysis approaches are constrained by the programming language itself and cross function precision, do not scale well for very large source code, and may not handle missing source code well. Modern systems are comprised of dozens of different programming languages further compounding the aforementioned problem. By its nature, static code analysis also only provides a snapshot of non-executing code and does not capture dynamic or execution time information.

Numerous tools exist for statically identifying source code dependencies for specific programming languages. These tools suffer from the above-described limitations, as well as provide a conservative analysis, resulting in numerous false dependencies and making it very difficult to identify any relevant dependencies.

SUMMARY

Embodiments of the present invention are directed to vector-based identification of software dependency relationships. A non-limiting example computer-implemented method includes determining a first dependency relationship value between a first code segment and a second code segment. The method also includes calculating a magnitude vector based on the first dependency relationship value and a second dependency relationship value corresponding to the first code segment and the second code segment. The method also includes determining a relationship score for the first code segment and the second code segment based on the magnitude vector and the first dependency relationship value Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide vector-based identification of software dependency relationships. A software dependency relationship between two code segments can be quantified by a graph edge having a weight calculated based on the probability that the two code segments will be updated together. A historical database of software dependency relationships can be maintained, and a modifier for a given software dependency relationship can be calculated based on a slope between the current value of the dependency relationship and one or more historical values of the dependency relationship, as well the magnitude of the software dependency relationship when compared to a point at the beginning of a recent discrete time window. The modifier for a given software dependency relationship can be calculated by identifying the values of the dependency relationship edge weight over the discrete time window, creating a unit vector for each of the identified values, and using the magnitude of the unit vector to create the modifier. Relatively recent upward and downward trends in a software dependency relationship can be identified based on the modifier, and can be isolated from older historical data. The modifier can be applied to a current value of the relationship, such that a dependency relationship that is determined to be trending upwards can be given precedence over another dependency relationship that is trending downwards, even if the current base weights of both dependency relationships are relatively similar.

A weighted relationship value, which gives a measurement of a dependency relationship between two code segments in a software product, can be determined based on a source code dependency graph, also referred to as a dependency graph. The dependency relationship graph can be created by computing the probability that changes to different code segments will be made together based on historical code management artifacts, such as defects, changes, fixes, and new features. Clusters of dependent and related source code components at various levels can be identified and represented in dependency graphs. The dependency graphs are programming language independent, and enable a highly granular cross function interaction view of the dynamic relationships between software code segments of the software product. In exemplary embodiments, the dependency graphs are created based on the history of changes to the software product, for example, by taking snapshots of the software product code through time, such as at different releases or development milestones, to build graph models and to monitor and discover new or decaying dependency relationships. The weighted relationship values can be stored in a code segment relationship database, and embodiments of vector-based identification of software dependency relationships can determine trends in weighted relationship values by processing the data in the code segment relationship database.

Figure 1:
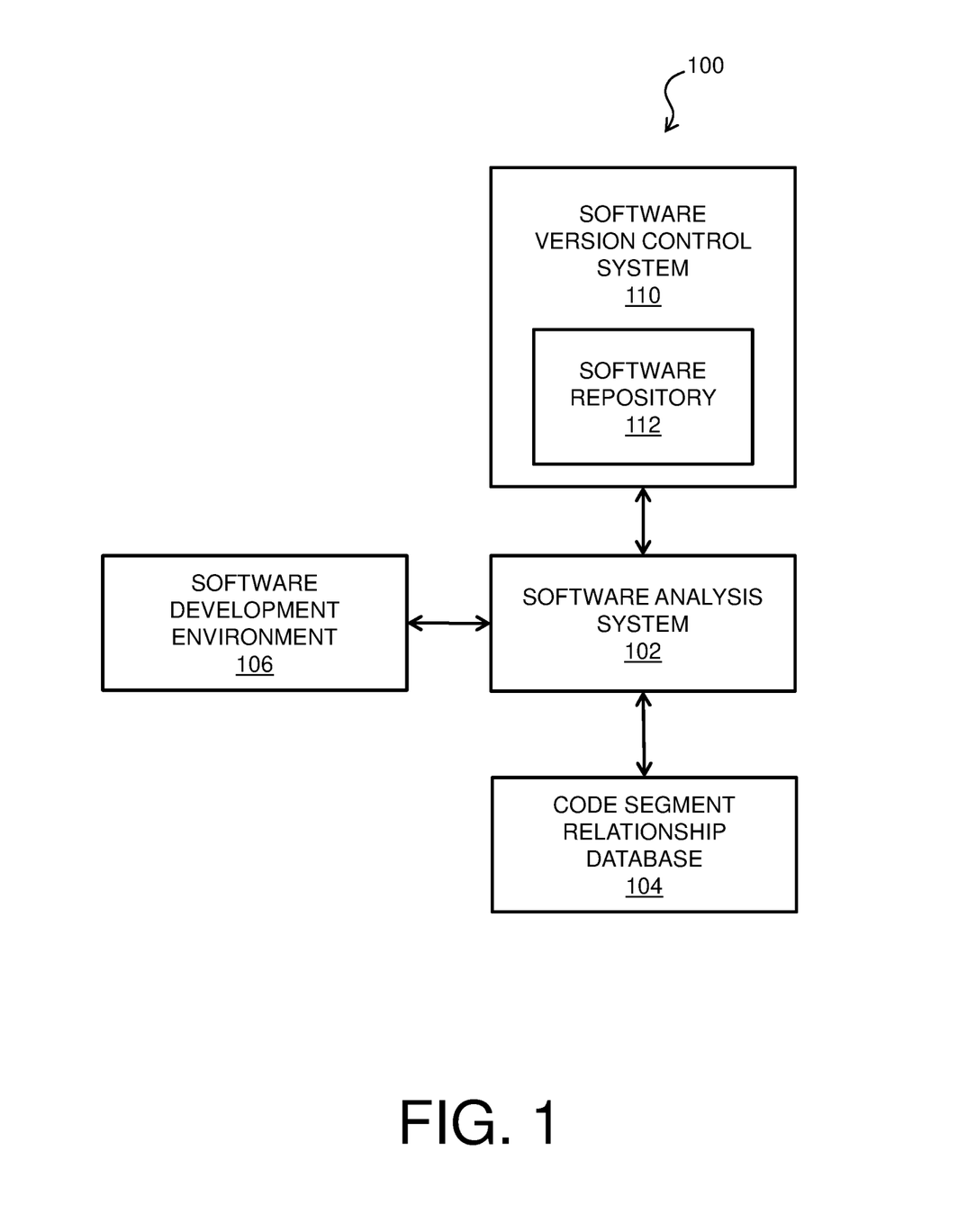
FIG. 1 is a block diagram of components of a system for vector-based identification of software dependency relationships in accordance with one or more embodiments of the present invention.

Turning now to FIG. 1, system 100 that includes vector-based identification of software dependency relationships is generally shown in accordance with one or more embodiments of the present invention. As illustrated, the system 100 includes a software analysis system 102, which may be embodied in a computer system 600 such as the one shown in FIG. 6, which is in communication with a software version control system 110. In exemplary embodiments, the software analysis system 102 is configured to receive a change history for a software product from the software version control system 110 and to analyze the change history to maintain a code segment relationship database 104 for the software product. In one embodiment, the software version control system 110 maintains a software version repository 112 that can be used to obtain change history for the software product. The change history includes a plurality of change elements that each include an identifier of a segment of code that was changed and a date that the change was made. In addition, the change elements can also include additional information such as a change size, a reason for the change (e.g., feature, defect), an indication of the severity of the change, an indication of the impact of the change, or logical grouping identifier, such as a defect identifier.

In exemplary embodiments, the software analysis system 102 is configured to receive an update to a code segment from a software development environment 106 and to utilize the code segment relationship database 104 to determine if the updated code segment is related to, i.e., dependent to or from, another code segment. Based on a determination that the updated code segment is related to another code segment, the software analysis system 102 is configured to provide an alert to a developer of the updated code segment of the related code segments. Software analysis system 102 can determine code segment relationship values based on a software dependency graph in some embodiments of the invention, and store the code segment relationship values in the code segment relationship database 104. A trend in a code segment relationship value corresponding to two code segments can be identified by determining a slope of the particular code segment relationship value over a discrete time window, and the code segment relationship can be prioritized by software analysis system 102 based on, for example, the code segment relationship value being determined to be trending upwards over the discrete time window based on the determined slope. Operation of software analysis system 102 in system 100 of FIG. 1 is discussed in further detail below with respect to method 200 of FIG. 2 and method 300 of FIG. 3.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
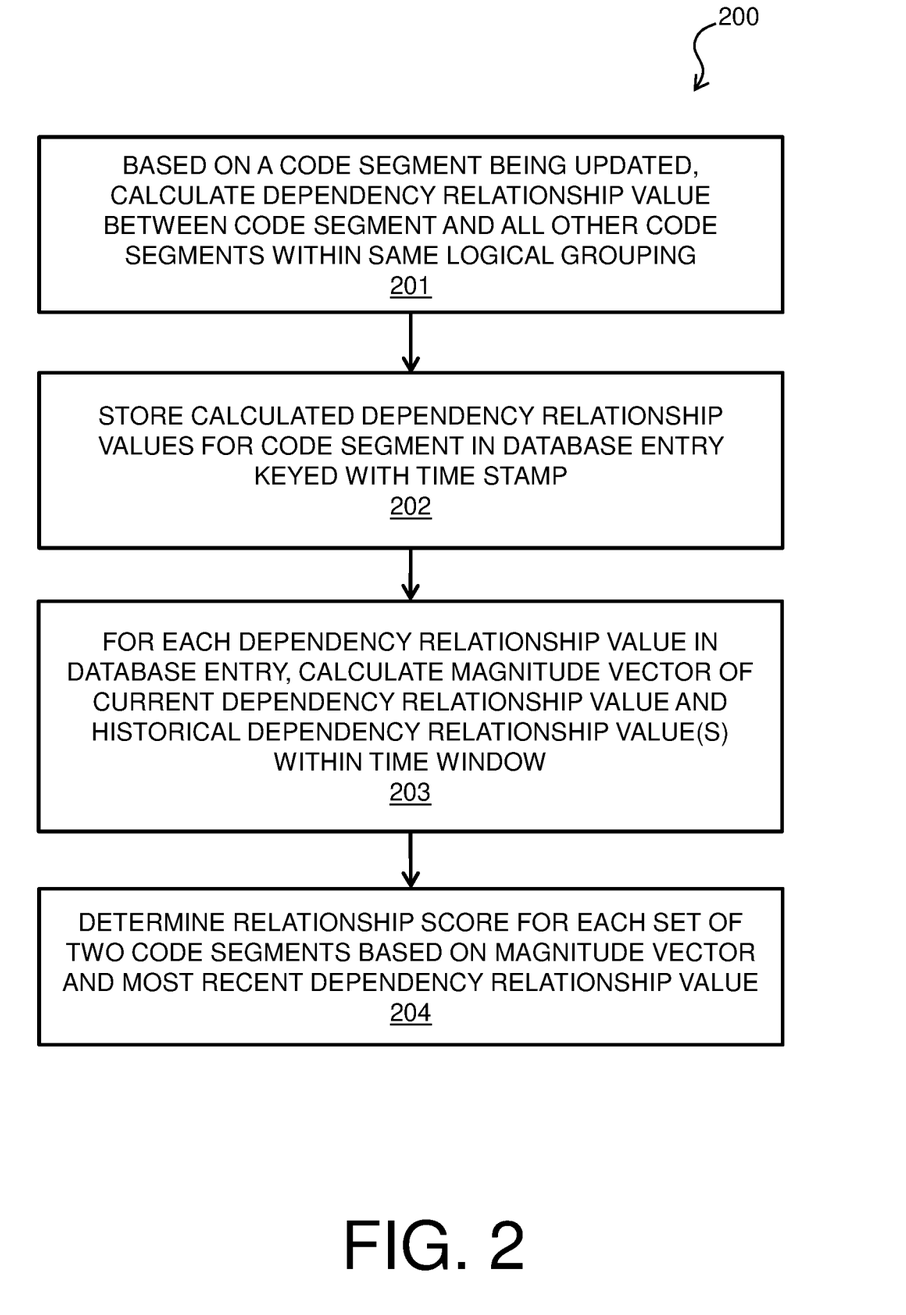
FIG. 2 is a flow diagram of a process for vector-based identification of software dependency relationships in accordance with one or more embodiments of the present invention.

FIG. 2 shows a process flow diagram of a method 200 for vector-based identification of software dependency relationships in accordance with one or more embodiments of the present invention. Method 200 of FIG. 2 can be implemented in conjunction with embodiments of software analysis system 102 of system 100 of FIG. 1. Embodiments of method 200 can modify a computed software dependency relationship between two code sections such that historical trends in the software dependency relationship (e.g., upwards or downwards trends) can be identified. In block 201 of method 200, based on a code segment s being updated, a respective dependency relationship value $s_r$ is calculated between the code segment s and any other code segments within a same logical grouping as the code segment s in, for example, a software product or set of software products. In some embodiments of the invention, the dependency relationships of block 201 can be calculated based on the weighted edges of a source code dependency graph. The logical grouping of block 201 can include any appropriate corpus of source code, including but not limited to a software product or set of related software products. A code segment can correspond to any appropriate unit of source code in various embodiments of the invention.

In some embodiments of block 201 of method 200, a source code dependency graph can be created based on the plurality of change elements, the dependency graph having nodes that correspond to the code segments and edges that connect nodes that were both updated at in the same logical grouping, i.e., at the same time. In one embodiment, a determination that both code segments were updated in the same logical grouping may be based on determining that the date of both code segments were changed is the same. In one embodiment, a determination that both code segments were updated at the same time may be based on determining that a time difference between timestamps of the changes of both code segments is less than a threshold amount, such as one hour, two hours, or the like. In exemplary embodiments, the edges may be directional edges or non-directional edges. A weight of the edges of the source code dependency is determined based on the probability that the nodes connected by an edge will be updated together. For example, a probability that node A will be updated when node B is updated can be calculated by: (the number of times node A has been updated on the same date as B)/(the number of times node A has been updated). Various other factors can be used in calculating the weights of the edges including giving a higher weight to recent changes, giving more weight to more frequent changes, giving more weight to certain types of changes, giving more weight based on severity or impacts of defects, and any combination of the different possible weighing approaches or probability algorithms.

In block 202, the dependency relationship values $s_r \in s$ that were calculated in block 201 are stored in a new database entry, keyed with a unique time-stamp corresponding to the time of the update of s in block 201, in code segment relationship database 104. Each $s_r$ value in the database entry corresponds to a relationship between a single pair of code segments, i.e. s and another code segment in the logical grouping. In block 203, for each $s_r$ in the database entry that was created in block 202, a magnitude vector is determined between the current value of $s_r$ in the database entry and each historical value of $s_r$ within a discrete time window corresponding to the same pair of code segments in the database. For example, $\Delta$ can be a discrete time window containing all database entries taken for code section s between the current time t and a preceding time t−n. For each $s_r \in s$, a magnitude vector $\Delta_{sr}$ can be determined by taking the square root of the sum of each $s_r$ value taken between t−n and t. The discrete time window can have any appropriate length in various embodiments of the invention, and the historical values of $s_r$ can be identified as being within the time window based on time stamps that are associated with each database entry in code segment relationship database 104. The magnitude vector $\Delta_{sr}$ can be stored in code segment relationship database 104. The magnitude vector can correspond to a slope in the value of $s_r$ over the discrete time window, and can be used to identify a trend in a value over the time window. In block 204, the magnitude vector can be applied as a modifier to the most recent $s_r$ value to determine a single relationship score for a particular dependency relationship. For example, a product of $\Delta_{sr}$ and the most recent $s_r$ value can be determined in order to take into account trends in the particular dependency relationship. The relationship score of block 204 can be provided to a user (e.g., a developer) via, for example, software development environment 106, in some embodiments of the invention. For example, a developer may be notified regarding two code segments that have a dependency relationship that is trending upwards, as indicated by the relationship score.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
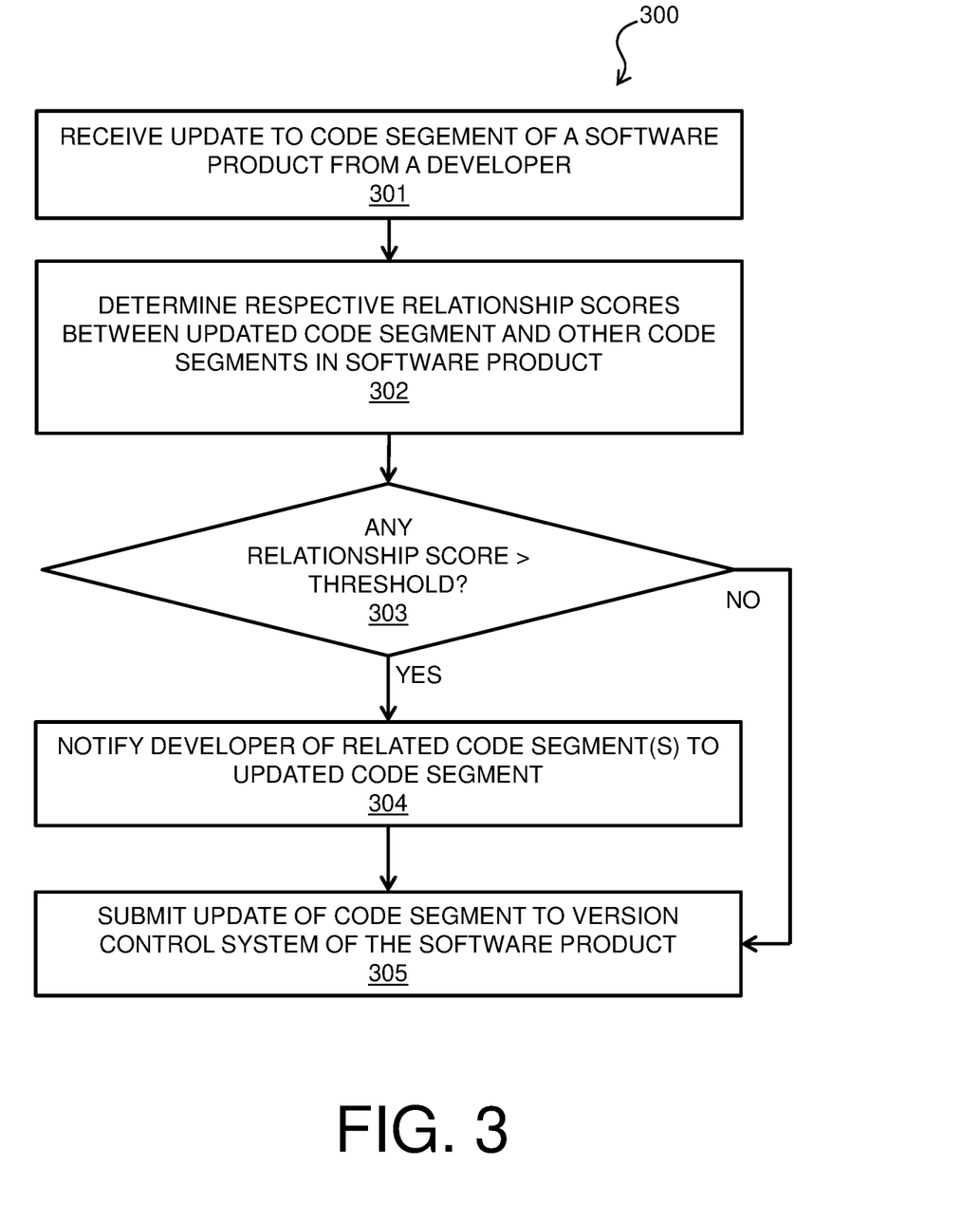
FIG. 3 is a flow diagram of a process for updating a software product based on vector-based identification of software dependency relationships in accordance with one or more embodiments of the present invention.

FIG. 3 shows a process flow diagram of a method 300 for updating a software product based on vector-based identification of software dependency relationships in accordance with one or more embodiments of the present invention. Method 300 can be implemented in conjunction with embodiments of system 100 of FIG. 1. As shown in block 301, method 300 includes receiving an update to a code segment of a software product that is tracked by a software version control system 110 from a developer. In exemplary embodiments, the update to the code segment is received by the software analysis system 102 from a software development environment 106. Method 300 also includes determining respective relationship scores between the updated code segment of block 301 and any other code segments that are in a same logical grouping as the updated code segment. The relationship scores of block 302 can be determined as discussed above with respect to method 200 of FIG. 2 by software analysis system 102 based on data that is stored in code segment relationship database 104. The relationship scores of block 302 take into account trends in the software dependency values over a discrete time window. Next, as shown in block 303, the method 300 includes determining if the updated code segment is related to another code segment in the logical grouping. In exemplary embodiments, the determination that the code segment is related to another code segment in the software product is based on whether the relationship score of the updated code segment and the another code segment exceeds a threshold value. If the code segment is determined to be related to another code segment in the software product, the method 300 proceeds to block 304 and includes notifying the developer of the related code segments. In exemplary embodiments, the notification includes alerting the developer via the software development environment 106, where the alert includes an indication of the determined related code segments. The developer can determine whether any code segment that was determined to be related to the updated code segment also requires an update based on the alert of block 304 in some embodiments of the invention. Flow then proceeds from block 304 to block 305. If the updated code segment is not related to another code segment in the software product, method 300 proceeds from block 303 straight to block 305. In block 305, the update of the code segment from block 301 is submitted to software version control system 110.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
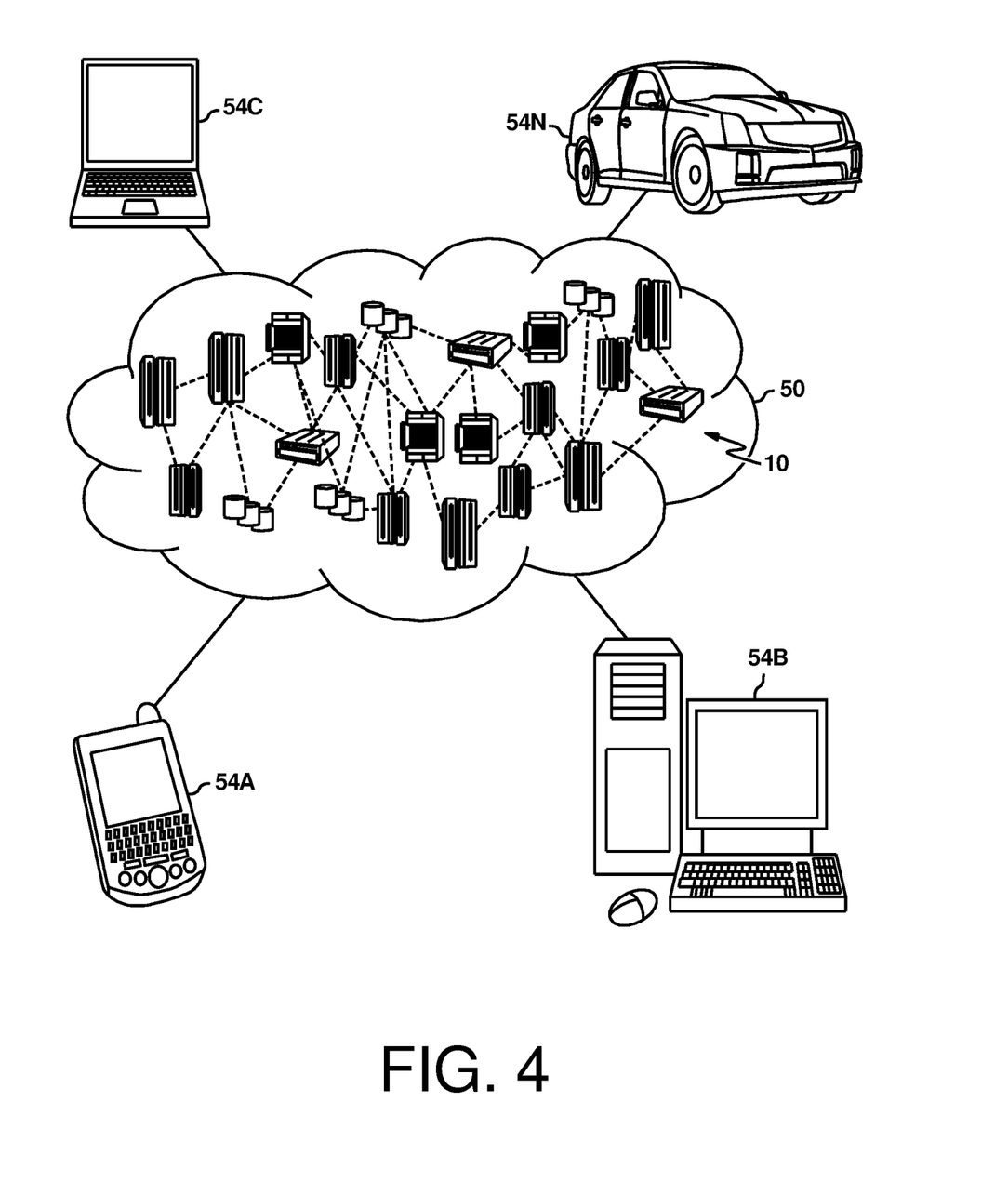
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
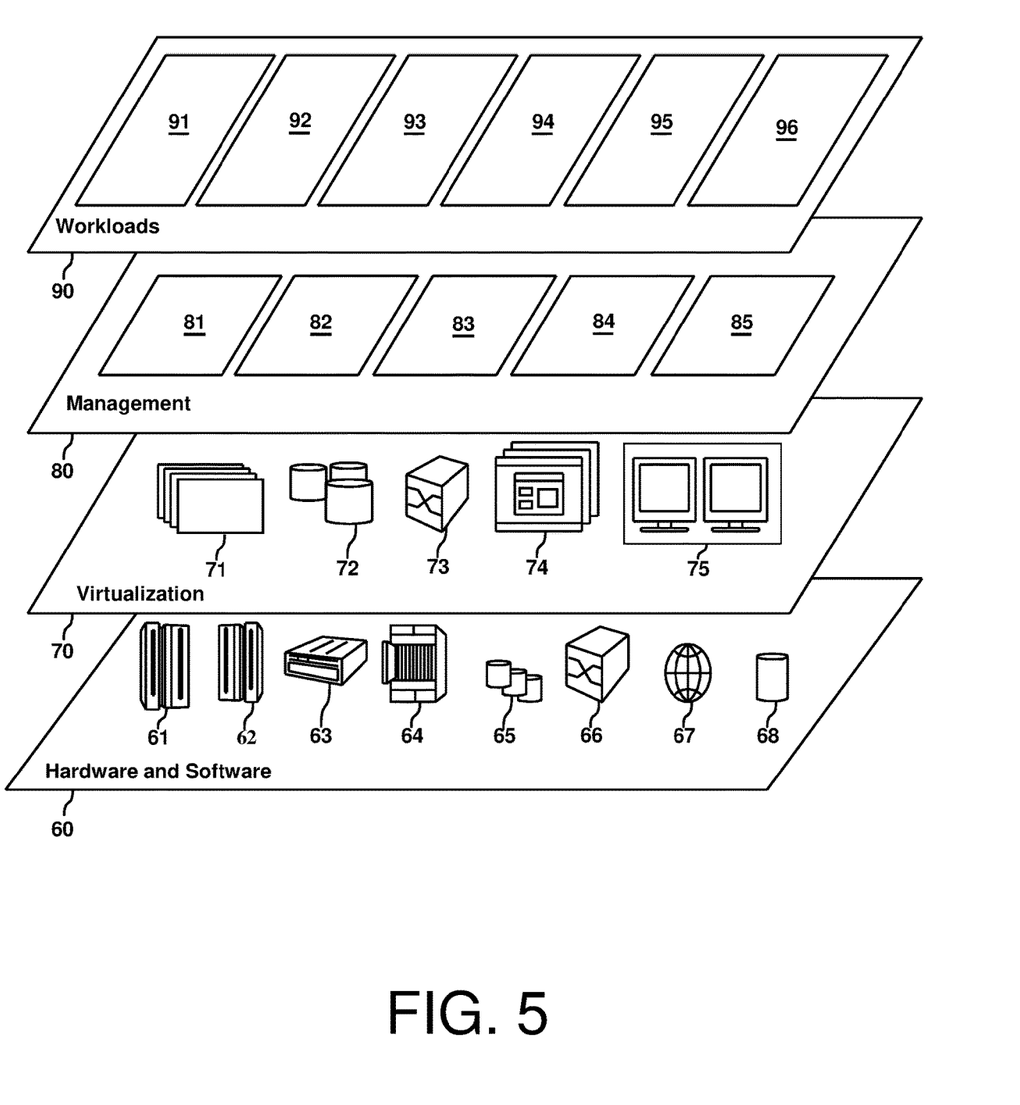
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described herein. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software analysis 96. Software analysis 96 can implement embodiments of vector-based identification of software dependency relationships as discussed above with respect to FIGS. 1-3.

Figure 6:
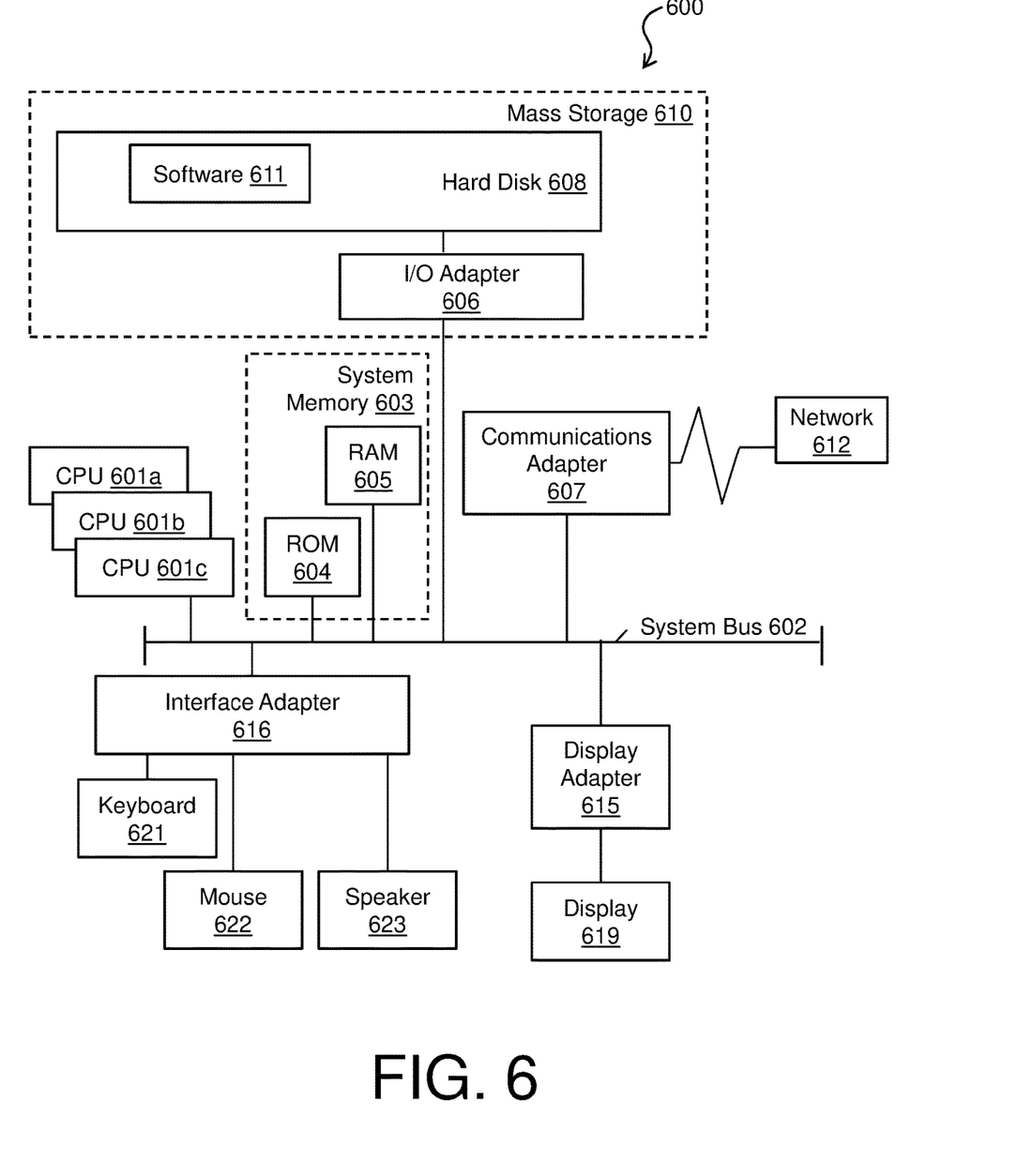
FIG. 6 is a block diagram of an example computer system for use in conjunction with one or more embodiments of vector-based identification of software dependency relationships.

Turning now to FIG. 6, a computer system 600 is generally shown in accordance with an embodiment. Embodiments of computer system 600 can be implemented by cloud computing nodes 10 of FIG. 4. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a processor, a first dependency relationship value between a first code segment and a second code segment;
   calculating, by the processor, a magnitude vector based on the first dependency relationship value, wherein the magnitude vector comprises a slope value corresponding to a trend in the first dependency relationship value over a discrete time window; and
   calculating a second dependency relationship value corresponding to the first code segment and the second code segment, wherein the second dependency relationship value comprises a historical dependency relationship value that is within a discrete time window from the first dependency relationship value;
   determining, by the processor, a relationship score for the first code segment and the second code segment based on the magnitude vector and the first dependency relationship value; and
   determining that the first code segment and the second code segment are related based on the relationship score being above a threshold value.

2. The method of claim 1, wherein the first dependency relationship value is determined based on receiving an update to the first code segment.

3. The method of claim 1, further comprising:
   notifying a developer corresponding to the first code segment based on determining that the first code segment and the second code segment are related; and
   updating the second code segment based on determining that the first code segment and the second code segment are related.

4. The method of claim 1, further comprising:
   determining a respective dependency relationship value between the first code segment and each of a plurality of code segments in a software product; and
   determining a respective relationship score corresponding to each of the determined respective dependency relationship values.

5. The method of claim 1, wherein the first dependency relationship value is determined based on a source code dependency graph.

6. A system comprising:
   a memory having computer readable instructions; and
   one or more processors for executing the computer readable instructions, the computer readable instructions controlling the one or more processors to perform operations comprising:
   determining a first dependency relationship value between a first code segment and a second code segment;

calculating a magnitude vector based on the first dependency relationship value, wherein the magnitude vector comprises a slope value corresponding to a trend in the first dependency relationship value over a discrete time window; and calculating a second dependency relationship value corresponding to the first code segment and the second code segment, wherein the second dependency relationship value comprises a historical dependency relationship value that is within a discrete time window from the first dependency relationship value;

determining a relationship score for the first code segment and the second code segment based on the magnitude vector and the first dependency relationship value; and determining that the first code segment and the second code segment are related based on the relationship score being above a threshold value.

7. The system of claim 6, wherein the first dependency relationship value is determined based on receiving an update to the first code segment.

8. The system of claim 6, wherein the operations further comprise:

notifying a developer corresponding to the first code segment based on determining that the first code segment and the second code segment are related; and updating the second code segment based on determining that the first code segment and the second code segment are related.

9. The system of claim 6, wherein the operations further comprise:

determining a respective dependency relationship value between the first code segment and each of a plurality of code segments in a software product; and determining a respective relationship score corresponding to each of the determined respective dependency relationship values.

10. The system of claim 6, wherein the first dependency relationship value is determined based on a source code dependency graph.

11. A computer program product comprising a computer readable storage medium having program instructions embodied therewith, the program instructions executable by one or more processors to cause the one or more processors to perform operations comprising:

determining a first dependency relationship value between a first code segment and a second code segment;

calculating a magnitude vector based on the first dependency relationship value, wherein the magnitude vector comprises a slope value corresponding to a trend in the first dependency relationship value over a discrete time window; and calculating a second dependency relationship value corresponding to the first code segment and the second code segment, wherein the second dependency relationship value comprises a historical dependency relationship value that is within a discrete time window from the first dependency relationship value;

determining a relationship score for the first code segment and the second code segment based on the magnitude vector and the first dependency relationship value; and determining that the first code segment and the second code segment are related based on the relationship score being above a threshold value.

12. The computer program product of claim 11, wherein the first dependency relationship value is determined based on receiving an update to the first code segment.

13. The computer program product of claim 11, wherein the operations further comprise:

notifying a developer corresponding to the first code segment based on determining that the first code segment and the second code segment are related; and updating the second code segment based on determining that the first code segment and the second code segment are related.

14. The computer program product of claim 11, wherein the operations further comprise:

determining a respective dependency relationship value between the first code segment and each of a plurality of code segments in a software product; and determining a respective relationship score corresponding to each of the determined respective dependency relationship values.

* * * * *